(12) United States Patent
Sun

(10) Patent No.: US 9,093,727 B2
(45) Date of Patent: Jul. 28, 2015

(54) COOLING SYSTEM FOR A BATTERY PACK

(75) Inventor: Hongguang Sun, Whitby (CA)

(73) Assignee: GM Global Technology Operations LLC, Detroit, MI (US)

( * ) Notice: Subject to any disclaimer, the term of this patent is extended or adjusted under 35 U.S.C. 154(b) by 808 days.

(21) Appl. No.: 12/752,316

(22) Filed: Apr. 1, 2010

(65) Prior Publication Data

US 2011/0244291 A1 Oct. 6, 2011

(51) Int. Cl.
 H01M 10/50 (2006.01)
 H01M 10/42 (2006.01)
 H01M 10/613 (2014.01)
 H01M 10/6556 (2014.01)
 H01M 10/6566 (2014.01)

(52) U.S. Cl.
 CPC ...... *H01M 10/5004* (2013.01); *H01M 10/4207* (2013.01); *H01M 10/5057* (2013.01); *H01M 10/5073* (2013.01)

(58) Field of Classification Search
 CPC ... H01M 6/50–6/5038; H01M 10/50–10/5018; H01M 10/5028; H01M 10/5032; H01M 10/5061–10/5073
 USPC ........................................................ 429/120
 See application file for complete search history.

(56) References Cited

U.S. PATENT DOCUMENTS

| 5,585,204 | A | * | 12/1996 | Oshida et al. | ............... | 429/62 |
| 2005/0287426 | A1 | * | 12/2005 | Kim et al. | ............... | 429/149 |
| 2006/0093901 | A1 | | 5/2006 | Lee et al. | | |
| 2006/0214633 | A1 | * | 9/2006 | Cho | ............... | 320/112 |
| 2007/0099061 | A1 | * | 5/2007 | Na et al. | ............... | 429/38 |

FOREIGN PATENT DOCUMENTS

| JP | 2006324041 A | * | 11/2006 | ............ | H01M 10/60 |
| WO | WO 2008114923 A1 | * | 9/2008 | ............ | H01M 2/10 |

OTHER PUBLICATIONS

Machine Translation of JP 2006-324041 (Nov. 2006).*

* cited by examiner

*Primary Examiner* — Basia Ridley
*Assistant Examiner* — Jacob Buchanan
(74) *Attorney, Agent, or Firm* — Fraser Clemens Martin & Miller LLC; James D. Miller

(57) ABSTRACT

A cooling system for a battery pack including a tapered first conduit for receiving a fluid therein, a second conduit for receiving the fluid therein, and at least one secondary conduit for receiving the fluid therein, the first conduit in fluid communication with the second conduit through at least one fluid channel formed between a plurality of battery units, wherein the battery units are in heat transfer communication with the at least one fluid channel to transfer heat from the battery units to the fluid disposed in the cooling system.

18 Claims, 1 Drawing Sheet

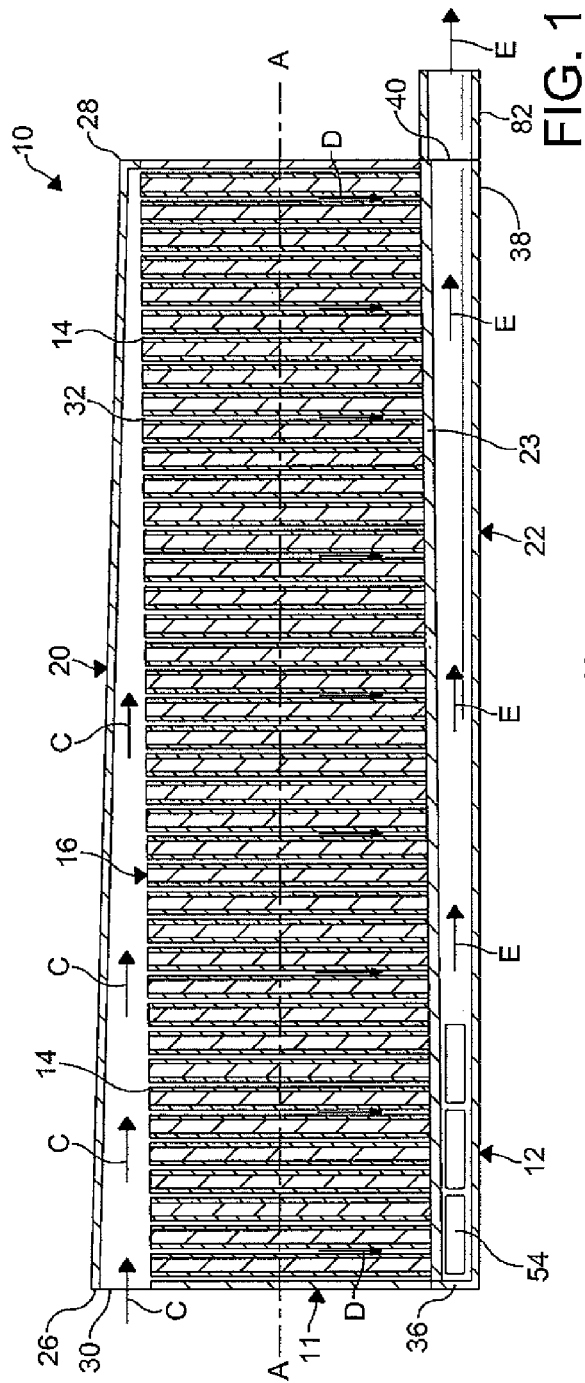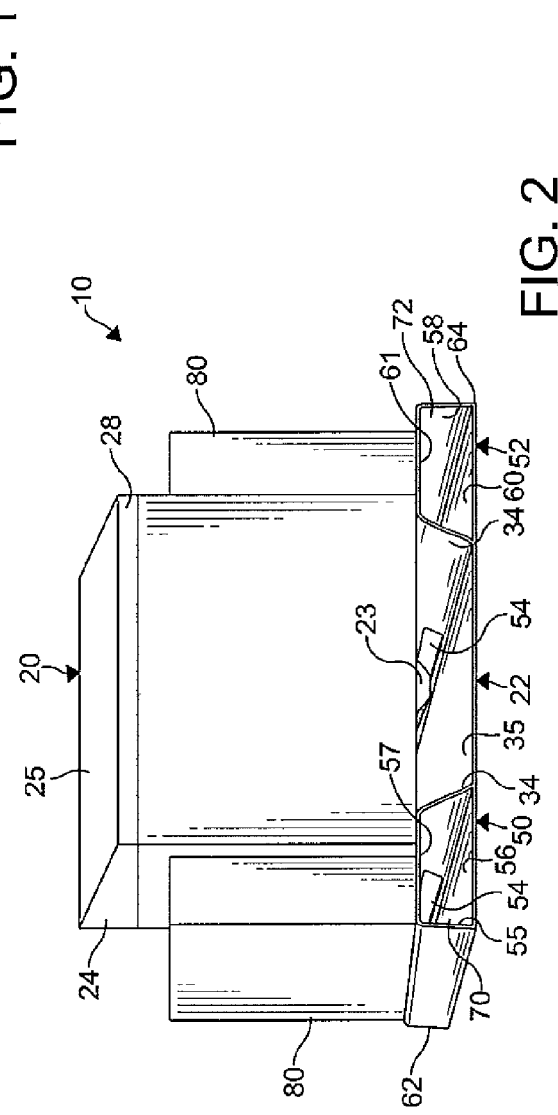

COOLING SYSTEM FOR A BATTERY PACK

FIELD OF THE INVENTION

The present disclosure relates to a component for a battery pack, and more particularly to a cooling system for a battery pack.

BACKGROUND OF THE INVENTION

A battery pack has been proposed as a clean, efficient and environmentally responsible power source for electric vehicles and various other applications. The battery pack typically includes numerous components and devices such as a plurality of individual battery cells, a plurality of spaced apart battery holders, cooling conduits, and control modules, for example. Two types of battery cells are a nickel-metal hydride (NiMH) cell and a lithium-ion battery cell. Both the NiMH and the lithium-ion battery cells are rechargeable and can be formed into a wide variety of shapes and sizes so as to efficiently fill available space in electric vehicles.

Both the NiMH and the Lithium-ion battery cells are known to generate heat during a charge and discharge cycle of operation. Overheating of the battery cells or an exposure thereof to high-temperature environments, may undesirably affect the operation of the battery assembly. Accordingly, cooling systems are typically employed with the battery cells in the battery pack. Prior art cooling systems, however, cause a significant temperature variation among the individual battery cells and a substantial pressure variation in fluid channels formed between the battery cells. Particularly, a pressure drop of the fluid channels at an inlet end of the battery pack is much lower than a pressure drop of the fluid channels at an outlet end of the battery pack. As a result, flow rates and surface convection coefficients of the fluid channels at the inlet end of the battery pack are less than flow rates and surface convection coefficients of the fluid channels at the outlet end of the battery pack.

Therefore, it is desirable to produce a battery pack including a cooling system, wherein temperature and pressure variations in the battery pack and a size thereof are minimized, and a capacity and a durability of the battery pack are maximized.

SUMMARY OF THE INVENTION

In concordance and agreement with the present invention, a battery pack including a cooling system, wherein temperature and pressure variations in the battery pack and a size thereof are minimized, and a capacity and a durability of the battery pack are maximized, is surprisingly discovered.

In an embodiment, the battery pack for a battery system comprises: a battery assembly including a plurality of battery units having at least one fluid channel formed therebetween for receiving a fluid therein; and a cooling system coupled to the battery assembly, the cooling system including a tapered first conduit for receiving the fluid therein, a second conduit for receiving the fluid therein, and at least one secondary conduit coupled to the second conduit for receiving the fluid therein, the second conduit in fluid communication with the first conduit through the at least one fluid channel of the battery assembly, and the secondary conduit in fluid communication with the second conduit, wherein the fluid absorbs heat from the battery assembly.

In another embodiment, the battery pack for a battery system comprises: a battery assembly including a plurality of battery units having at least one fluid channel formed therebetween for receiving a fluid therein; and a cooling system coupled to the battery assembly, the cooling system including a tapered first conduit for receiving the fluid therein, a tapered second conduit for receiving the fluid therein, and at least one secondary conduit coupled to the second conduit for receiving the fluid therein, the second conduit in fluid communication with the first conduit through the at least one fluid channel of the battery assembly, and the secondary conduit in fluid communication with the second conduit, wherein the battery units are in heat transfer communication with the at least one fluid channel to facilitate a transfer of heat from the battery units to the fluid disposed in the cooling system.

In another embodiment, the battery pack for a battery system comprises: a battery assembly including a plurality of battery units having at least one fluid channel formed therebetween for receiving a fluid therein; and a cooling system coupled to the battery assembly, the cooling system including a tapered first conduit for receiving the fluid therein having an open first end and a closed second end, a tapered second conduit for receiving the fluid therein having a closed first end and an open second end, and at least one secondary conduit, the first conduit in fluid communication with the second conduit through the at least one fluid channel of the battery assembly, and the second conduit including a plurality of apertures formed therein to facilitate fluid communication between the second conduit and the at least one secondary conduit, wherein a cross-sectional area of the first conduit gradually decreases from the first end to the second end thereof and a cross-sectional area of the second conduit gradually increases from the first end to the second end thereof, and wherein the battery units are in heat transfer communication with the at least one fluid channel to facilitate a transfer of heat from the battery units to the fluid disposed in the cooling system.

DRAWINGS

The above, as well as other advantages of the present disclosure, will become readily apparent to those skilled in the art from the following detailed description, particularly when considered in the light of the drawings described herein.

FIG. 1 is a cross-sectional side elevational view of a battery pack according to an embodiment of the invention; and FIG. 2 is a schematic front perspective view of the battery pack illustrated in FIG. 1.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, are not necessary or critical.

FIGS. 1-2 show a battery pack 10 for a battery system according to an embodiment of the present invention. The battery pack 10 can be used in any suitable application such as an electric vehicle, for example. The battery pack 10 includes a battery assembly 11 and a cooling system 12.

The battery assembly 11 includes a plurality of spaced apart battery holders 14 and a plurality of battery units 16. As illustrated, one of the battery units 16 is disposed between a pair of cooperating battery holders 14. Additional or fewer battery units 16 than shown can be employed in the battery assembly 11 as desired. As illustrated, the battery units 16 are pouch/prismatic battery cells such as a prismatic lithium ion (Li-ion) battery cell and a nickel-metal hydride (NiMH) battery cell, for example. It is understood that other battery units 16, employing different structure and electrochemistry, may be used as desired. Each of the battery units 16 includes a first battery cell (not shown) and a second battery cell (not shown). The battery cells include at least one planar, outer surface. A spacer (not shown) may be disposed between the battery cells if desired. The spacer militates against an undesirable movement of the battery units during operation of the battery pack 10. In a non-limiting example, the spacer is formed from a nonconductive foam that deforms with a contraction of the battery assembly 11. It is understood, however, that the spacer can be formed from any suitable material as desired.

In the embodiment shown, the cooling system 12 includes a pair of conduits 20, 22. It is understood that the conduits 20, 22 can be affixed to the battery assembly 11 by any suitable means as desired such as by a welding process, a brazing process, an adhesive, fasteners, and the like, for example. It is further understood that the conduits 20, 22 can be integrally formed with the battery assembly 11 if desired. The conduits 20, 22 can be formed from any suitable material as desired such as a plastic material and a metal material, for example. In a non-limiting example, the conduits 20, 22 are formed from the plastic material to minimize a mass of the battery pack 10. In another non-limiting example, the conduits 20, 22 are formed from the metal material to provide support to the battery pack 10. As illustrated, a support member 23 is disposed in the conduit 22 adjacent the battery assembly 11 and parallel to a longitudinal axis A of the battery pack 10 to provide further support to the battery pack 10.

The conduit 20 shown is defined by a pair of sidewalls 24 and an upper wall 25. The conduit 20 includes an open first end 26 and a closed second end 28. Although a width of the conduit 20 corresponds to a width of the battery assembly 11, it understood that the conduit 20 can have any width as desired. In a non-limiting example, the width of the conduit 20 is about 200 mm. As illustrated, the conduit 20 is tapered having a gradually decreasing height and cross-sectional area from the first end 26 to the second end 28. Accordingly, the height and cross-sectional area of the conduit 20 at the first end 26 is greater than the height and cross-sectional area of the conduit 20 at the second end 28. In a non-limiting example, the height of the conduit 20 is about 25 mm at the first end 26 and gradually tapers to about 4 mm at the second end 28. It is understood that the conduit 20 can be tapered having a gradually decreasing width from the first end 26 to the second end 28 if desired. The first end 26 of the conduit 20 includes an inlet 30. The inlet 30 is in fluid communication with a source of fluid (not shown) such as the atmosphere, cooling air, or a fan/blower, for example. It is understood that the fluid can be any fluid as desired such as ambient air or a coolant, for example. The conduit 20 is in fluid communication with the conduit 22 through at least one fluid channel 32 formed between adjacent battery holders 14 of the battery assembly 11.

The conduit 22 shown is defined by a pair of sidewalls 34 and a lower wall 35. The sidewalls 34 slope inwardly from an outer periphery of the battery assembly 11 to the lower wall 35. The conduit 22 includes a closed first end 36 and an open second end 38. Although a width of the conduit 22 corresponds to a width of the battery assembly 11, it understood that the conduit 22 can have any width as desired. In a non-limiting example, the width of the conduit 22 is about 200 mm. As illustrated, the conduit 22 is tapered having a gradually increasing height and cross-sectional area from the first end 36 to the second end 38. Accordingly, the height and cross-sectional area of the conduit 22 at the first end 36 is less than the height and cross-sectional area of the conduit 22 at the second end 38. In a non-limiting example, the height of the conduit 22 is about 16 mm at the first end 36 and gradually tapers to about 27 mm at the second end 38. In another non-limiting example, the taper of the conduit 22 is substantially less than the taper of the conduit 20. In another non-limiting example, the taper of the conduit 22 corresponds with the taper of the conduit 20, wherein the upper wall 25 of the conduit 20 is substantially parallel with the lower wall 35 of the conduit 22. It is understood that the conduit 22 can be substantially flat, wherein the height and cross-sectional area of the first end 36 is substantially equal to the height and cross-sectional of the second end 38, if desired. It is further understood that the conduit 20 can be tapered, having a gradually decreasing width from the first end 26 to the second end 28 if desired. The second end 38 includes an outlet 40. The outlet 40 is in fluid communication with an exhaust conduit 82, an external depository for fluid disposal, or the atmosphere, for example, if desired. As illustrated, the second conduit 22 is inversely tapered in respect of the first conduit 20 to minimize an overall size of the battery pack 10. Accordingly, the space in the vehicle occupied by the battery pack 10 is also minimized.

The cooling system 12 further includes secondary conduits 50, 52. As illustrated, the secondary conduits 50, 52 are disposed on opposite sides of the conduit 22 adjacent the sidewalls 34 thereof. A plurality of apertures 54 is formed in each of the sidewalls 34 of the conduit 22 adjacent the first end 36 to facilitate a flow of the fluid from the conduit 22 to each of the secondary conduits 50, 52. It is understood that the sidewalls 34 can have any number of apertures 54 formed therein as desired. In a non-limiting example, each of the sidewalls 34 has a length of about 635 mm and includes three apertures 54 formed within about 185 mm from the first end 36 of the conduit 22. Each of the apertures 54 shown has a length of about 50 mm, a height of about 10 mm, and an area of about 500 mm$^2$. It is understood, however, that the apertures 54 can have any shape and size as desired. The secondary conduits 50, 52 can be formed from any suitable material as desired such as a plastic material and a metal material, for example. In a non-limiting example, the conduits 50, 52 are formed from a plastic material to minimize a mass of the battery pack 10. In another non-limiting example, the conduits 50, 52 are formed from a metal material to provide support to the battery pack 10. It is understood that the secondary conduits 50, 52 can be any conduit in fluid communication with the conduit 22 as desired such as a flexible hose or a pipe connected to and in fluid communication with the apertures 54, for example.

In the embodiment shown, the secondary conduit 50 is defined by an outer wall 55, one of the sidewalls 34 of the conduit 22, a lower wall 56, and an upper wall 57. The secondary conduit 52 is defined by an outer wall 58, one of the sidewalls 34 of the conduit 22, a lower wall 60, and an upper wall 61. Each of the secondary conduits 50, 52 includes a closed first end 62 and an open second end 64. Although a width of each of the secondary conduits 50, 52 is about twenty-five percent (25%) the width of the conduit 22, it understood that the secondary conduits 50, 52 can have any width as desired. In a non-limiting example, the width of each of the secondary conduits 50, 52 is about 50 mm. As illustrated, the secondary conduits 50, 52 are tapered, having a gradually increasing height and cross-sectional area from the first end 62 to the second end 64. Accordingly, the height and cross-sectional area of the secondary conduits 50, 52 at the first end 62 is less than the height and cross-sectional area of the secondary conduits 50, 52 at the second end 64. In a non-limiting example, the height of the secondary conduits 50, 52 is about 16 mm at the first end 62 and gradually tapers to about 27 mm at the second end 64. In another non-limiting example, the taper of the secondary conduits 50, 52 is substantially less than the taper of the conduit 20. In another non-limiting example, the taper of the secondary conduits 50, 52 corresponds with the taper of the conduit 20, wherein the upper wall 25 of the conduit 20 is substantially parallel with the respective lower walls 56, 60 of the secondary conduits 50, 52. It is understood that the secondary conduits 50, 52 can be substantially flat, wherein the height and cross-sectional area of the first end 62 can be substantially equal to the height and cross-sectional area of the second end 64 and the upper wall 61 is substantially parallel with the lower wall 60. It is further understood that the secondary conduits 50, 52 can be tapered, having a gradually decreasing width from the first end 62 to the second end 64 if desired. The second end 64 of the secondary conduits 50, 52 includes respective outlets 70, 72. The outlets 70, 72 are in fluid communication with the exhaust conduit 82, a fan/blower, an external depository for fluid disposal, or the atmosphere, for example, if desired. As illustrated in FIG. 1, the exhaust conduit 82 may be disposed adjacent and in fluid communication with the open ends 38, 64 of the conduits 22, 50, 52. It is understood that the exhaust conduit 82 may be in fluid communication with a fan/blower, an external depository for fluid disposal, or the atmosphere, for example, if desired.

The battery pack 10 may further include at least one control module 80 for controlling an operation of the battery assembly 11. It is understood that the control module 80 can include any device or component as desired such as a battery cell current sensor, a battery cell balancer, and the like, for example. As shown in FIG. 2, a control module 80 is disposed on each side of the battery assembly 11 adjacent the secondary conduits 50, 52. The control modules 80 are disposed within the overall dimensions of the battery pack 10 to minimize the space occupied by the battery pack 10 in the vehicle. It is understood that the battery pack 10 may further include additional components as desired such as end frames, end assemblies, compression rods, retention loops, and assembly covers, for example.

In use of the battery pack 10, the fluid is supplied from the source of fluid to the inlet 30 of the tapered first conduit 20. The fluid is circulated through the conduit 20, as indicated by arrows C, and caused to flow into the fluid channels 32 formed between the battery holders 14. The fluid flows through the fluid channels 32, as indicated by arrows D, to facilitate a transfer of heat from the planar, outer surfaces of the battery units 16 to the fluid. The heated fluid is then caused to flow into the second conduit 22. The conduits 20, 22 minimize a temperature variation among the battery cells and a pressure drop of the battery pack 10. Particularly, the decrease in height and cross-sectional area of the respective closed ends 28, 36 of the conduits 20, 22 minimizes a variation between a pressure in the fluid channels 32 adjacent the open end of the conduit 20 and a pressure in the fluid channels 32 adjacent the open end of the conduit 22. As a result, a variation between flow rates and surface convection coefficients of the fluid channels 32 adjacent the open end of the conduit 20 and flow rates and surface convection coefficients of the fluid channels 32 adjacent the open end of the conduit 22 is also minimized.

Thereafter, as indicated by arrows E, a portion of the heated fluid is then exhausted from the tapered conduit 22 through the outlet 40 and through the exhaust conduit 82. In the embodiment shown, at least a portion of the heated fluid is caused to flow from the conduit 22, through the apertures 54 formed in the sidewalls 34 of the conduit 22, and into the secondary conduits 50, 52. The portion of the heated fluid in the secondary conduit 50, 52 is then exhausted from the secondary conduits 50, 52 through the outlets 70, 72, and through the exhaust conduit 82. The secondary conduits 50, 52 further minimize the temperature variation among the battery cells and the pressure drop of the battery pack 10. Particularly, the secondary conduits 50, 52 facilitate an increase in the flow rate of the heated fluid through the fluid channels 32 adjacent the open end of the conduit 20. Accordingly, the flow rates and the surface convection coefficients of the fluid channels 32 adjacent the open end of the conduit 20 are substantially equal to the flow rates and the surface convection coefficients of the fluid channels 32 adjacent the open end of the conduit 22 without increasing a height of the battery pack 10. In a non-limiting example, the temperature variation among battery cells can be minimized to about 1.4° C. and the pressure drop of the battery pack 10 minimized to about 42% less than a pressure drop of a battery pack having the same overall dimensions as the battery pack 10 and substantially flat cooling conduits.

While certain representative embodiments and details have been shown for purposes of illustrating the invention, it will be apparent to those skilled in the art that various changes may be made without departing from the scope of the disclosure, which is further described in the following appended claims.

What is claimed is:

1. A battery pack for a battery system comprising:
a battery assembly including a plurality of battery units having a plurality of fluid channels formed therebetween for receiving a fluid therein; and
a cooling system coupled to the battery assembly, the cooling system including a tapered first conduit having an inlet for receiving the fluid therein, the first conduit having a width extending along a first width in a width direction of the battery assembly, wherein the width direction is a direction crossing the fluid direction of the first conduit, a second conduit for receiving the fluid therein having a width corresponding to the first width defined by a first side wall and a second side wall, the second conduit having a first end proximate the inlet of the first conduit and a first outlet, and at least one secondary conduit coupled to the second conduit for receiving the fluid therein having a secondary outlet, the at least one secondary conduit defined by one of the first side wall or the second side wall and further defined by an outer wall, a lower wall, and an upper wall, the at least one secondary conduit extends beyond the first width of the battery assembly in the width direction, the second conduit in fluid communication with the first conduit through the plurality of fluid channels of the battery assembly and the second conduit including at least one aperture formed through the first or second side wall that defines the at least one secondary conduit to facilitate fluid communication between the second conduit and the at least one secondary conduit, the at least one aperture positioned proximate the first end of the second conduit to increase a flow rate of the fluid from the inlet of the first conduit through at least one of the fluid channels located proximate the inlet of the first conduit, and a combined cross-sectional area of the first outlet and the secondary outlet is greater than a cross-sectional area of the inlet to facilitate increased flow rate of the fluid, wherein the fluid absorbs heat from the battery assembly.

2. The battery pack of claim 1, wherein a cross-sectional area of the second conduit is substantially equal from a first end to a second end thereof.

3. The battery pack of claim 1, wherein the second conduit is tapered.

4. The battery pack of claim 3, wherein the second conduit is inversely tapered in respect of the first conduit.

5. The battery pack of claim 3, wherein a taper of the second conduit is less than a taper of the first conduit.

6. The battery pack of claim 1, wherein a cross-sectional area of the at least one secondary conduit is substantially equal from a first end to a second end thereof.

7. The battery pack of claim 1, wherein the at least one secondary conduit is tapered.

8. The battery pack of claim 7, wherein a taper of the at least one secondary conduit is less than a taper of the first conduit.

9. A battery pack for a battery system comprising:
   a battery assembly including a plurality of battery units having a plurality of fluid channels formed therebetween for receiving a fluid therein; and
   a cooling system coupled to the battery assembly, the cooling system including a tapered first conduit having an inlet for receiving the fluid therein, the first conduit having a width extending along a first width in a width direction of the battery assembly, wherein the width direction is a direction crossing the fluid direction of the first conduit, a tapered second conduit for receiving the fluid therein having a width corresponding to the first width defined by a first side wall and a second side wall, the tapered second conduit including a first outlet, the second conduit having a first end proximate the inlet of the first conduit and at least one secondary conduit coupled to the second conduit for receiving the fluid therein having a secondary outlet, the at least one secondary conduit defined by one of the first side wall or the second side wall and further defined by an outer wall, a lower wall, and an upper wall, the at least one secondary conduit extends beyond the first width of the battery assembly in the width direction, the second conduit in fluid communication with the first conduit through the plurality of fluid channels of the battery assembly and the second conduit including at least one aperture formed through the first or second side wall that defines the at least one secondary conduit to facilitate fluid communication between the second conduit and the at least one secondary conduit, the at least one aperture positioned proximate the first end of the second conduit to increase a flow rate of the fluid from the inlet of the first conduit through at least one of the fluid channels located proximate the inlet of the first conduit, and a combined cross-sectional area of the first outlet and the secondary outlet is greater than a cross-sectional area of the inlet to facilitate increased flow rate of the fluid, wherein the battery units are in heat transfer communication with the at least one fluid channel to facilitate a transfer of heat from the battery units to the fluid disposed in the cooling system.

10. The battery pack of claim 9, wherein the second conduit is inversely tapered in respect of the first conduit.

11. The battery pack of claim 9, wherein a taper of the second conduit is less than a taper of the first conduit.

12. The battery pack of claim 9, wherein a cross-sectional area of the at least one secondary conduit is substantially equal from a first end to a second end thereof.

13. The battery pack of claim 9, wherein the at least one secondary conduit is tapered.

14. The battery pack of claim 13, wherein a taper of the at least one secondary conduit is less than a taper of the first conduit.

15. A battery pack for a battery system comprising:
   a battery assembly including a plurality of battery units having a plurality of fluid channels formed therebetween for receiving a fluid therein; and
   a cooling system coupled to the battery assembly, the cooling system including a tapered first conduit for receiving the fluid therein having an open first end and a closed second end, the first conduit having a width extending along a first width in a width direction of the battery assembly, wherein the width direction is a direction crossing the fluid direction of the first conduit, a tapered second conduit having a width corresponding to the first width defined by a first side wall and a second side wall, the tapered second conduit for receiving the fluid therein having a closed first end and an open second end, and at least one secondary conduit having a first end proximate the open first end of the first conduit, the at least one secondary conduit defined by one of the first side wall or the second side wall and further defined by an outer wall, a lower wall, and an upper wall, the at least one secondary conduit extends beyond the first width of the battery assembly in the width direction, the first conduit in fluid communication with the second conduit through the plurality of fluid channels of the battery assembly, and the second conduit including a plurality of apertures formed through the first or second side wall that defines the at least one secondary conduit to facilitate fluid communication between the second conduit and the at least one secondary conduit, the plurality of apertures positioned proximate the first end of the second conduit to increase a flow rate of the fluid through at least one of the plurality of flow channels located proximate the open first end of the first conduit, wherein a cross-sectional area of the first conduit gradually decreases from the first end to the second end thereof and a cross-sectional area of the second conduit gradually increases from the first end to the second end thereof, the cross-sectional area of the open first end of the first conduit is less than the cross-sectional area of the open second end of the second conduit, and wherein the battery units are in heat transfer communication with the at least one fluid channel to facilitate a transfer of heat from the battery units to the fluid disposed in the cooling system.

16. The battery pack of claim 15, wherein the second conduit is inversely tapered in respect of the first conduit.

17. The battery pack of claim 15, wherein a taper of the second conduit is less than a taper of the first conduit.

18. The battery pack of claim 15, further comprising at least one control module disposed adjacent the battery assembly.

* * * * *